United States Patent
Bendlin et al.

(10) Patent No.: US 11,483,079 B2
(45) Date of Patent: *Oct. 25, 2022

(54) MULTIDIMENSIONAL GRID SAMPLING FOR RADIO FREQUENCY POWER FEEDBACK

(71) Applicant: AT&T Intellectual Property I, L.P., Atlanta, GA (US)

(72) Inventors: Ralf Bendlin, Cedar Park, TX (US); Salam Akoum, Austin, TX (US); Xiaoyi Wang, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/453,982

(22) Filed: Nov. 8, 2021

(65) Prior Publication Data

US 2022/0060263 A1 Feb. 24, 2022

Related U.S. Application Data

(63) Continuation of application No. 17/195,747, filed on Mar. 9, 2021, now Pat. No. 11,201,680, which is a
(Continued)

(51) Int. Cl.
*H04B 17/10* (2015.01)
*H04B 17/00* (2015.01)

(52) U.S. Cl.
CPC ....... *H04B 17/104* (2015.01); *H04B 17/0085* (2013.01); *H04B 17/102* (2015.01)

(58) Field of Classification Search
CPC ............ H04B 17/102; H04B 17/104; H04B 17/0085; H04B 17/382; H04B 7/0626;
(Continued)

(56) References Cited

U.S. PATENT DOCUMENTS

| | | | | |
|---|---|---|---|---|
| 4,644,562 A | * | 2/1987 | Kavehrad | H04B 7/002 375/348 |
| 6,018,317 A | * | 1/2000 | Dogan | H04B 7/0857 342/373 |

(Continued)

FOREIGN PATENT DOCUMENTS

| | | |
|---|---|---|
| WO | 2017/044501 A1 | 3/2017 |
| WO | 2017/100666 A1 | 6/2017 |

OTHER PUBLICATIONS

C. Liu, F. Xi, S. Chen, Y. D. Zhang and Z. Liu, "Pulse-doppler signal processing with quadrature compressive sampling," in IEEE Transactions on Aerospace and Electronic Systems, vol. 51, No. 2, pp. 1217-1230, Apr. 2015, doi: 10.1109/TAES.2014.130475. (Year: 2015).*

(Continued)

*Primary Examiner* — James M Perez

(74) *Attorney, Agent, or Firm* — Amin, Turocy & Watson, LLP

(57) ABSTRACT

The described technology is generally directed towards multidimensional grid sampling for radio frequency power feedback. A mobile device can sample radio frequency signal power at multiple sample points, and can send sample values to a base station. The multiple sample points can be defined with reference to a grid having a first dimension and a second dimension, such as time and frequency, or delay and Doppler. A variety of techniques are provided to define the multiple sample points.

20 Claims, 11 Drawing Sheets

Related U.S. Application Data continuation of application No. 16/419,561, filed on May 22, 2019, now Pat. No. 10,979,151.

(58) Field of Classification Search
CPC .............. H04B 7/0663; H04L 27/2644; H04L 27/2646; H04L 27/3881; H04L 25/021
See application file for complete search history.

(56) References Cited

U.S. PATENT DOCUMENTS

| | | | | |
|---|---|---|---|---|
| 6,654,429 | B1* | 11/2003 | Li | H04L 27/2647 375/349 |
| 6,826,240 | B1* | 11/2004 | Thomas | H04L 25/022 375/340 |
| 7,292,651 | B2* | 11/2007 | Li | H04L 27/2647 375/349 |
| 7,551,547 | B2* | 6/2009 | Ghosh | H04L 25/0216 370/208 |
| 7,986,614 | B2* | 7/2011 | Ghosh | H04L 25/022 370/335 |
| 8,064,507 | B1* | 11/2011 | Cheng | H04B 7/01 375/340 |
| 8,649,254 | B2* | 2/2014 | Ghosh | H04L 25/022 370/208 |
| 8,675,769 | B1* | 3/2014 | Eliaz | H04L 1/0054 375/135 |
| 9,197,283 | B1* | 11/2015 | Nguyen | H03M 1/128 |
| 9,686,702 | B2* | 6/2017 | Beyme | H04B 17/3911 |
| 9,991,976 | B2* | 6/2018 | Hu | H04B 7/0413 |
| 10,020,930 | B2* | 7/2018 | Pelissier | H03M 7/30 |
| 10,171,214 | B2* | 1/2019 | Wang | H04B 7/0626 |
| 10,257,105 | B2* | 4/2019 | Majmundar | H04L 45/42 |
| 10,355,887 | B2* | 7/2019 | Hadani | H04L 25/08 |
| 10,404,337 | B1* | 9/2019 | Tan | G01R 29/10 |
| 10,530,504 | B2* | 1/2020 | Fechtel | H04L 25/0224 |
| 10,547,397 | B2* | 1/2020 | Chopra | H04B 17/309 |
| 10,651,912 | B2* | 5/2020 | Wang | H04B 1/0475 |
| 10,666,479 | B2* | 5/2020 | Hadani | H04B 7/01 |
| 10,673,659 | B2* | 6/2020 | Hadani | H04L 25/03178 |
| 10,708,091 | B2* | 7/2020 | Fechtel | H04L 25/03159 |
| 10,826,591 | B1* | 11/2020 | Akoum | H04B 7/0621 |
| 10,886,985 | B2* | 1/2021 | Ramireddy | H04B 7/0673 |
| 10,886,991 | B2* | 1/2021 | Akoum | H04B 7/01 |
| 10,951,454 | B2* | 3/2021 | Delfeld | H04L 27/34 |
| 10,979,151 | B2* | 4/2021 | Bendlin | H04B 17/318 |
| 11,038,733 | B2* | 6/2021 | Hadani | H04L 27/265 |
| 11,050,530 | B2* | 6/2021 | Wang | H04L 27/261 |
| 11,070,329 | B2* | 7/2021 | Hadani | H04L 27/2639 |
| 11,082,352 | B2 | 8/2021 | Majmundar et al. | |
| 11,184,074 | B2* | 11/2021 | Akoum | H04L 25/0222 |
| 11,201,680 | B2* | 12/2021 | Bendlin | H04B 17/318 |
| 2005/0002461 | A1* | 1/2005 | Giannakis | H04L 25/0228 375/259 |
| 2006/0176941 | A1* | 8/2006 | Nieto | H04L 25/03038 375/152 |
| 2006/0269016 | A1* | 11/2006 | Long | H04L 5/0048 375/346 |
| 2007/0230335 | A1* | 10/2007 | Sang | H04L 47/822 370/252 |
| 2008/0304416 | A1* | 12/2008 | Fodor | H04L 47/25 370/237 |
| 2009/0003134 | A1* | 1/2009 | Nuttall | G01S 15/101 367/87 |
| 2009/0129493 | A1* | 5/2009 | Zhang | H04L 1/005 375/260 |
| 2009/0274252 | A1* | 11/2009 | Ghosh | H04L 25/0216 370/208 |
| 2010/0111231 | A1* | 5/2010 | Koorapaty | H04L 5/0048 375/340 |
| 2010/0271259 | A1* | 10/2010 | Stafford | G01S 19/28 342/357.21 |
| 2011/0150052 | A1* | 6/2011 | Erell | H04B 7/0641 375/267 |
| 2011/0243284 | A1* | 10/2011 | Ghosh | H04L 27/2647 375/346 |
| 2011/0286507 | A1* | 11/2011 | Yu | H04L 25/0234 375/224 |
| 2012/0069887 | A1* | 3/2012 | Park | H04B 7/0626 375/224 |
| 2012/0082190 | A1* | 4/2012 | Zhu | H04B 7/063 375/267 |
| 2012/0082274 | A1* | 4/2012 | Bury | H04L 25/0202 375/346 |
| 2012/0114072 | A1* | 5/2012 | Liu | H04L 27/2608 375/295 |
| 2013/0051450 | A1* | 2/2013 | Ghosh | H04L 25/022 375/232 |
| 2013/0114654 | A1* | 5/2013 | Gomadam | H04B 7/0634 375/219 |
| 2013/0163537 | A1* | 6/2013 | Anderson | H04L 1/1671 370/329 |
| 2013/0201912 | A1* | 8/2013 | Sheng | H04B 7/0663 370/328 |
| 2013/0329772 | A1* | 12/2013 | Wernersson | H04B 7/0469 375/219 |
| 2014/0161154 | A1* | 6/2014 | Hadani | H04L 27/265 375/138 |
| 2014/0169406 | A1* | 6/2014 | Hadani | H04L 27/2639 375/131 |
| 2014/0169437 | A1* | 6/2014 | Hadani | H04L 27/26532 375/232 |
| 2014/0177745 | A1* | 6/2014 | Krishnamurthy | H04B 7/063 375/267 |
| 2014/0301492 | A1* | 10/2014 | Xin | H04B 7/0456 375/267 |
| 2015/0043439 | A1* | 2/2015 | Sajadieh | H04W 48/16 370/329 |
| 2015/0078472 | A1* | 3/2015 | Vook | H04B 7/0617 375/267 |
| 2015/0117519 | A1 | 4/2015 | Kim et al. | |
| 2016/0119069 | A1* | 4/2016 | Mamidwar | H04N 21/64738 370/503 |
| 2016/0119096 | A1* | 4/2016 | Sun | H04L 27/2601 370/329 |
| 2016/0119097 | A1* | 4/2016 | Nam | H04M 3/5125 370/329 |
| 2016/0156394 | A1* | 6/2016 | Kim | H04B 7/0626 375/267 |
| 2017/0012749 | A1* | 1/2017 | Rakib | H04L 27/2639 |
| 2017/0012810 | A1* | 1/2017 | Rakib | H04L 5/0016 |
| 2017/0013486 | A1* | 1/2017 | Beyme | H04W 24/08 |
| 2017/0033899 | A1* | 2/2017 | Rakib | H04L 27/2655 |
| 2017/0041061 | A1* | 2/2017 | Lee | H04B 7/08 |
| 2017/0048029 | A1* | 2/2017 | Lee | H04B 7/0413 |
| 2017/0048810 | A1* | 2/2017 | Sahlin | H04L 27/26 |
| 2017/0064676 | A1* | 3/2017 | Lee | H04L 5/00 |
| 2017/0078054 | A1* | 3/2017 | Hadani | H04L 5/0023 |
| 2017/0093474 | A1* | 3/2017 | Lee | H04B 7/0632 |
| 2017/0099122 | A1* | 4/2017 | Hadani | H04L 27/2639 |
| 2017/0099607 | A1* | 4/2017 | Hadani | H04L 27/2639 |
| 2017/0149594 | A1* | 5/2017 | Rakib | H04L 27/2655 |
| 2017/0149595 | A1* | 5/2017 | Rakib | H04L 27/2639 |
| 2017/0288710 | A1* | 10/2017 | Delfeld | H04L 27/265 |
| 2017/0338925 | A1* | 11/2017 | Wei | H04W 52/0229 |
| 2018/0109284 | A1* | 4/2018 | Hadani | H04L 27/26416 |
| 2018/0198497 | A1* | 7/2018 | Wei | H04B 7/0469 |
| 2018/0205481 | A1* | 7/2018 | Shlomo | H04J 11/0026 |
| 2018/0227159 | A1* | 8/2018 | Rakib | H04L 27/26 |
| 2018/0262306 | A1* | 9/2018 | Hadani | H04L 5/0007 |
| 2018/0302176 | A1* | 10/2018 | Jeon | H04B 7/024 |
| 2018/0309598 | A1* | 10/2018 | Pena Campos | H04L 25/0224 |
| 2018/0323887 | A1* | 11/2018 | Azarian Yazdi | H04L 5/0007 |
| 2019/0013849 | A1* | 1/2019 | Kobayashi | H04B 17/3912 |
| 2019/0013983 | A1* | 1/2019 | Gao | H04B 7/01 |
| 2019/0036741 | A1* | 1/2019 | Hadani | H04L 25/03178 |
| 2019/0044682 | A1* | 2/2019 | Hebron | H04L 5/0048 |
| 2019/0068304 | A1* | 2/2019 | Fechtel | H04B 17/336 |
| 2019/0081836 | A1* | 3/2019 | Hadani | H04L 5/0023 |
| 2019/0089441 | A1* | 3/2019 | Sivahumaran | H04B 7/0478 |
| 2019/0199456 | A1 | 6/2019 | Chopra et al. | |

(56) References Cited

U.S. PATENT DOCUMENTS

| | | | |
|---|---|---|---|
| 2019/0207661 A1* | 7/2019 | Fröberg | H04B 17/373 |
| 2019/0230673 A1* | 7/2019 | Ren | H04W 72/085 |
| 2019/0238189 A1* | 8/2019 | Delfeld | H04L 27/26 |
| 2019/0245602 A1* | 8/2019 | Wang | H04L 25/03012 |
| 2019/0268112 A1* | 8/2019 | Parra Michel | H04L 27/0004 |
| 2019/0312623 A1* | 10/2019 | Park | H04B 7/0626 |
| 2019/0326959 A1* | 10/2019 | Davydov | H04B 7/0469 |
| 2019/0342126 A1* | 11/2019 | Hadani | H04L 25/03286 |
| 2019/0342136 A1* | 11/2019 | Hadani | H04L 27/2639 |
| 2019/0379422 A1* | 12/2019 | Hadani | H04B 1/69 |
| 2020/0028617 A1* | 1/2020 | Landis | H04L 1/0003 |
| 2020/0045569 A1* | 2/2020 | Seo | H04W 72/042 |
| 2020/0052931 A1* | 2/2020 | Fechtel | H04L 25/0246 |
| 2020/0099434 A1* | 3/2020 | Wang | H04B 7/0452 |
| 2020/0137774 A1* | 4/2020 | Molisch | H04L 25/025 |
| 2020/0177249 A1* | 6/2020 | Ramireddy | H04B 7/0486 |
| 2020/0200849 A1* | 6/2020 | Grodzki | G01R 33/565 |
| 2020/0204220 A1* | 6/2020 | Zirwas | H04B 7/0417 |
| 2020/0235799 A1* | 7/2020 | Wang | H04B 7/0626 |
| 2020/0244320 A1* | 7/2020 | Wang | H04B 7/0639 |
| 2020/0259692 A1* | 8/2020 | Hadani | H04L 27/2697 |
| 2020/0259697 A1* | 8/2020 | Delfeld | H04B 7/0452 |
| 2020/0287672 A1* | 9/2020 | Namboodiri | H04L 27/2623 |
| 2020/0373984 A1* | 11/2020 | Akoum | H04B 17/382 |
| 2020/0374014 A1* | 11/2020 | Bendlin | H04B 17/104 |
| 2020/0374068 A1* | 11/2020 | Wang | H04L 27/2639 |
| 2020/0389268 A1* | 12/2020 | Sathyanarayan | H04L 27/2647 |
| 2020/0412500 A1* | 12/2020 | Wang | H04L 25/0204 |
| 2021/0083742 A1* | 3/2021 | Akoum | H04B 7/0626 |
| 2021/0099210 A1* | 4/2021 | Ramireddy | H04B 7/0434 |
| 2021/0135905 A1* | 5/2021 | Kons | H04B 7/063 |
| 2021/0143885 A1* | 5/2021 | Großmann | H04B 7/0626 |
| 2021/0167825 A1* | 6/2021 | Ramireddy | H04B 7/0617 |
| 2021/0167879 A1* | 6/2021 | Vela García | H04B 17/3912 |
| 2021/0194602 A1* | 6/2021 | Bendlin | H04B 17/102 |
| 2021/0351880 A1* | 11/2021 | Hadani | H04L 5/0023 |
| 2022/0038155 A1* | 2/2022 | Akoum | H04L 25/0222 |
| 2022/0060263 A1* | 2/2022 | Bendlin | H04B 17/102 |
| 2022/0173855 A1 | 6/2022 | Akoum et al. | |

OTHER PUBLICATIONS

O. Bar-Ilan and Y. C. Eldar, "Sub-Nyquist Radar via Doppler Focusing," in IEEE Transactions on Signal Processing, vol. 62, No. 7, pp. 1796-1811, Apr. 1, 2014, doi: 10.1109/TSP.2014.2304917. (Year: 2014).*

Non-Final Office Action received for U.S. Appl. No. 16/419,809 dated Dec. 9, 2021, 21 pages.
Non-Final Office Action received for U.S. Appl. No. 16/455,123 dated Sep. 3, 2020, 18 pages.
Final Office Action received for U.S. Appl. No. 16/419,809 dated Nov. 12, 2020, 29 pages.
Non-Final Office Action received for U.S. Appl. No. 16/419,809 dated Jun. 12, 2020, 14 pages.
Non-Final Office Action received for U.S. Appl. No. 16/419,432 dated May 14, 2020, 13 pages.
International Search Report and Written Opinion received for PCT Application Serial No. PCT/US2020/030805 dated Aug. 11, 2020, 12 pages.
Notice of Allowance received for U.S. Appl. No. 16/419,432 dated Sep. 23, 2020, 35 pages.
Non-Final Office Action received for U.S. Appl. No. 16/419,561 dated Sep. 17, 2020, 20 pages.
Notice of Allowance received for U.S. Appl. No. 16/455,123 dated Jan. 27, 2021, 50 pages.
Notice of Allowance received for U.S. Appl. No. 16/419,561 dated Dec. 10, 2020, 35 pages.
Non-Final Office Action received for U.S. Appl. No. 16/419,809 dated Jul. 22, 2021, 22 pages.
Notice of Allowance received for U.S. Appl. No. 17/195,747 dated Aug. 9, 2021, 52 pages.
Notice of Allowance received for U.S. Appl. No. 17/104,834 dated Jul. 16, 2021, 65 pages.
Non-Final Office Action received for U.S. Appl. No. 16/419,809 dated May 12, 2022, 34 pages.
Examination Report received for Indian Patent Application Serial No. 202147054104 dated Mar. 29, 2022, 7 pages.
Final Office Action received for U.S. Appl. No. 16/419,809 dated Dec. 9, 2021, 21 pages.
International Preliminary Report on Patentability received for PCT Application Serial No. PCT/US2020/030805 dated Jan. 6, 2022, 8 pages.
Communication pursuant to Rules 161(1) and 162 EPC received for E.P. Patent Application Serial No. 20727489.5 dated Feb. 3, 2022, 3 pages.
Final Office Action received for U.S. Appl. No. 16/419,809 dated Aug. 25, 2022, 18 pages.
Non Final Office Action received for U.S. Appl. No. 17/244,996 dated Aug. 4, 2022, 44 pages.
Non Final Office Action received for U.S. Appl. No. 17/504,878 dated Jun. 22, 2022, 132 pages.

* cited by examiner

MULTIDIMENSIONAL GRID SAMPLING FOR RADIO FREQUENCY POWER FEEDBACK

RELATED APPLICATIONS

The subject patent application is a continuation of, and claims priority to each of, U.S. patent application Ser. No. 17/195,747 (now U.S. Pat. No. 11,201,680), filed Mar. 9, 2021, and entitled "MULTIDIMENSIONAL GRID SAMPLING FOR RADIO FREQUENCY POWER FEEDBACK," which is a continuation of U.S. patent application Ser. No. 16/419,561 (now U.S. Pat. No. 10,979,151), filed May 22, 2019, and entitled "MULTIDIMENSIONAL GRID SAMPLING FOR RADIO FREQUENCY POWER FEEDBACK," the entireties of which applications are hereby incorporated by reference herein.

TECHNICAL FIELD

The subject application is related to wireless communication systems, and, for example, to channel state information (CSI) feedback from mobile communication devices to base station devices.

BACKGROUND

Channel state information (CSI) includes information sent from a mobile device, such as a cellular telephone, to a transmitter such as a base station. CSI provides information about the quality of radio frequency signals received at the mobile device. CSI can be used for any number of purposes, including but not limited to adjusting signal transmission, by the base station, as needed to improve signal quality at the mobile device.

Time-division duplex (TDD) communications use a same radio frequency for uplink communications from the mobile device to the base station, and downlink communications from the base station to the mobile device. The procurement of CSI for TDD communications benefits from channel reciprocity, because, for example, a base station receiver can estimate CSI in the uplink from the mobile device to the base station, and the base station can apply the estimated CSI in the downlink from the base station to the mobile device. This is because in TDD, the base station transmitter operates in the same spectrum as the base station receiver.

This is in contrast to frequency-division duplex (FDD) communications, where the base station transmitter and receiver operate simultaneously in different parts of the frequency spectrum and hence, the mobile device estimates CSI in one part of the spectrum (the downlink from the base station transmitter) and provides CSI feedback in the uplink to the base station receiver in a different part of the spectrum. Such CSI feedback incurs overhead and additional complexity at the mobile device, especially for so-called Type II CSI feedback schemes in the Third Generation Partnership Project (3GPP) New Radio (NR) fifth generation (5G) mobile communications standard.

Technologies which efficiently collect and send CSI for FDD communications in wireless communication networks are therefore desired.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
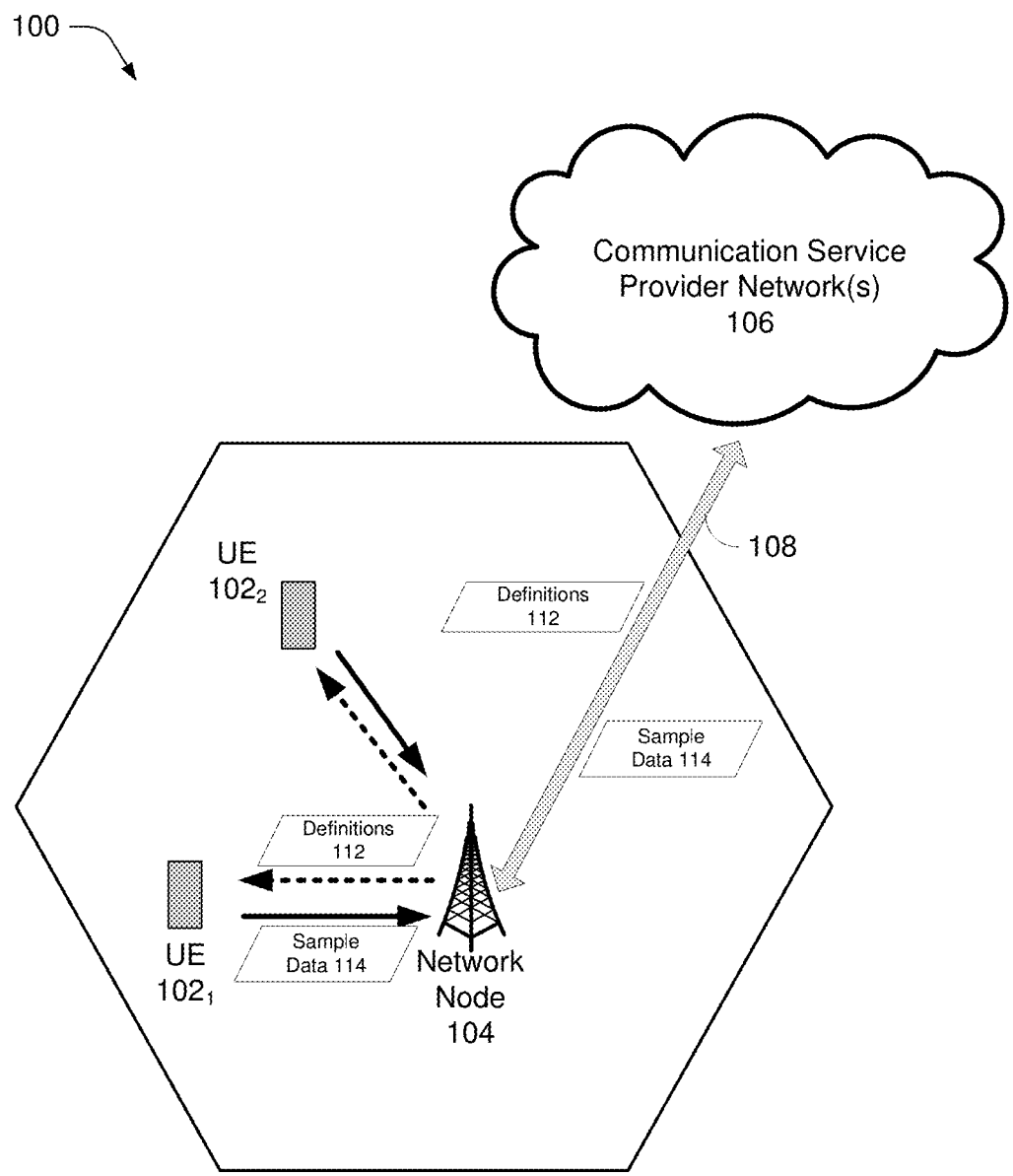
FIG. 1 illustrates a non-limiting example of a wireless communication system, in accordance with various aspects and implementations of the subject disclosure.

One or more aspects of the technology described herein are generally directed towards multidimensional grid sampling for radio frequency power feedback. A mobile device can sample radio frequency signal power at multiple sample points, and can send sample values, e.g., as channel state information, to a base station. The multiple sample points can be defined with reference to a grid having a first dimension and a second dimension. In some embodiments, the first dimension can be time and the second dimension can be a frequency dimension. In some embodiments, the first dimension can be delay and the second dimension can be a Doppler dimension. This disclosure provides a variety of techniques to define the multiple sample points, and protocols for sending definitions as well as compressing and sample data between the mobile device and the base station.

It should be understood that any of the examples and terms used herein are non-limiting. For instance, the examples are based on 5G communications between a user equipment exemplified as a smartphone or the like and network devices; however virtually any communications devices can benefit from the technology described herein, and/or their use in different spectrums can likewise benefit. Thus, any of the embodiments, aspects, concepts, structures, functionalities or examples described herein are non-limiting, and the technology can be used in various ways that provide benefits and advantages in radio communications in general.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "gNode B (gNB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), fifth generation core (5G Core), fifth generation option 3x (5G Option 3x), high speed packet access (HSPA), Z-Wave, Zigbee and other 802.XX wireless technologies and/or legacy telecommunication technologies.

FIG. 1 illustrates a non-limiting example of a wireless communication system 100 in accordance with various aspects and embodiments of the subject disclosure. In one or more embodiments, system 100 can comprise one or more mobile devices, such as user equipment UEs $102_1$ and $102_2$. The non-limiting term user equipment can refer to any type of device that can communicate with a network node in a cellular or mobile communication system. A UE can have one or more antenna panels having vertical and horizontal elements. Examples of a UE comprise a target device, device to device (D2D) UE, machine type UE or UE capable of machine to machine (M2M) communications, personal digital assistant (PDA), tablet, mobile terminals, smart phone, laptop mounted equipment (LME), universal serial bus (USB) dongles enabled for mobile communications, a computer having mobile capabilities, a mobile device such as cellular phone, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. User equipment UEs 102 can also comprise IOT devices that communicate wirelessly.

In various embodiments, system 100 is or comprises a wireless communication network serviced by one or more wireless communication network providers. In example embodiments, UEs 102 can be communicatively coupled to the wireless communication network via a network node 104. The network node (e.g., network node device) can communicate with user equipment (UE), thus providing connectivity between the UE and the wider cellular network.

The UEs 102 can send transmission type recommendation data to the network node 104. The transmission type recommendation data can comprise a recommendation to transmit data via a closed loop MIMO mode and/or a rank-1 precoder mode.

A network node can have a cabinet and other protected enclosures, an antenna mast, and multiple antennas for performing various transmission operations (e.g., MIMO operations). Network nodes can serve several cells, also called sectors, depending on the configuration and type of antenna. Network nodes can comprise base station devices. In example embodiments, UEs 102 can send and/or receive communication data via a wireless link to the network node 104. The dashed arrow lines from the network node 104 to the UEs 102 represent downlink (DL) communications and the solid arrow lines from the UEs 102 to the network node 104 represents an uplink (UL) communications.

In some embodiments, a UE such as UE $102_1$ can receive definitions 112 from the network node 104. The UE $102_1$ can perform sampling according to the received definitions 112, and the resulting sample data 114 can be sent from UE $102_1$ to network node 104. This basic framework may be modified in some embodiments as will be appreciated. For example, in some embodiments, definitions 112 can be generated at communication service provider network(s) 106, sent to network node 104, and then provided to UE $102_1$. In other embodiments, definitions 112 can be generated at network node 104 or at UE $102_1$. Furthermore, definitions 112 and sample data 114 can be configured in many different ways.

System 100 can further include one or more communication service provider networks 106 that facilitate providing wireless communication services to various UEs, including UEs 102, via the network node 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud based networks, millimeter wave networks and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.). The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

Wireless communication system 100 can employ various cellular systems, technologies, and modulation modes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers, e.g., LTE FDD/TDD, GSM/GERAN, CDMA2000, etc.

For example, system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g., interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks can comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks can allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network can utilize higher frequencies (e.g., >6 GHz) to aid in increasing capacity. Currently, much of the millimeter wave (mmWave) spectrum, the band of spectrum between 30 GHz and 300 GHz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications and has been widely recognized a potentially important component for access networks operating in higher frequencies. MIMO can be used for achieving diversity gain, spatial multiplexing gain and beamforming gain. For these reasons, MIMO systems are an important part of the 3rd and 4th generation wireless systems and are planned for use in 5G systems.

Figure 2:
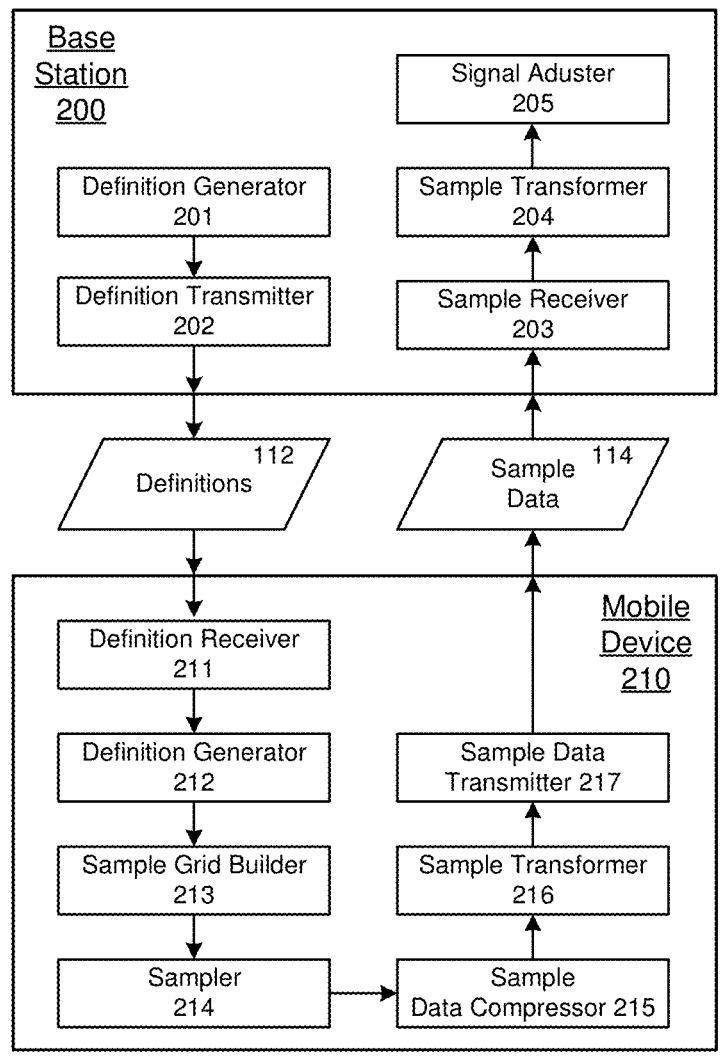
FIG. 2 is a block diagram illustrating example operations and interactions of a base station and a mobile device, in accordance with various aspects and implementations of the subject disclosure.

FIG. 2 is a block diagram illustrating operations at a base station and a mobile device, as well as interactions between the base station and the mobile device, in accordance with various aspects and implementations of the subject disclosure. Repetitive description of like elements employed in other embodiments described herein is omitted for sake of brevity. FIG. 2 includes a base station 200, and a mobile device 210, as well as definitions 112 and sample data 114 exchanged between the base station 200 and the mobile device 210.

Example components of base station 200 include a definition generator 201, a definition transmitter 202, a sample receiver 203, a sample transformer 204, and a signal adjuster 205. Example components of mobile device 210 include a definition receiver 211, a definition generator 212, a sample grid builder 213, a sampler 214, a sample data compressor 215, a sample transformer 216, and a sample data transmitter 217.

In an example process according to FIG. 2, a sample definition can be generated at definition generator 201. In an alternative embodiments, a sample definition can be generated at another device, e.g., within the communication service provider network 106 (see FIG. 1) and received at the base station 200. The sample definition can be included, e.g., in definitions 112. Definition transmitter 202 can transmit definitions 112 to the mobile device 210. The definitions 112 can be received at sample receiver 211. In embodiments wherein definitions 112 are not provided by base station 200, definition generator 212 can generate a sample definition locally at mobile device 210. The sample grid builder 213 may use the received or generated sample definition to build a sample grid and identify samples according to the sample definition. The sampler 214 may then proceed to perform the sampling at the sample points identified with respect to the sample grid. For example, sampler 214 can measure the strength of radio frequency signals at various different frequencies identified by the sample points. The resulting sample data can optionally be compressed at sample data compressor 215, and can optionally be transformed at sample transformer 216. Sample data transmitter 217 can transmit the resulting sample data 114 to base station 200. The sample data 114 can be received at sample receiver 203. Base station sample transformer 204 can optionally transform sample data 114. Signal adjuster 205 may then make use of the sample data 114, e.g., by adjusting signal transmissions and/or receiver settings at base station 200.

Figure 3:
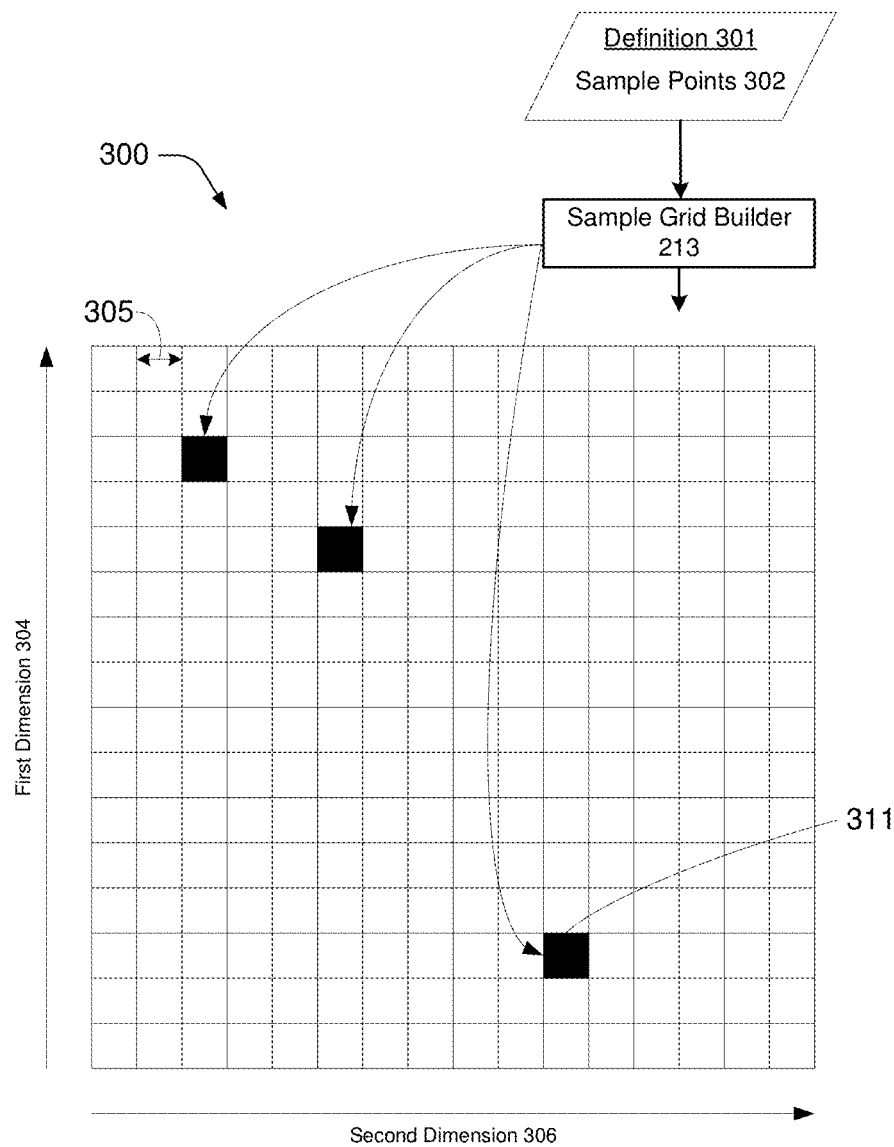
FIG. 3 is a diagram illustrating an example grid with a first dimension and a second dimension, and samples identified thereon, in accordance with various aspects and implementations of the subject disclosure.

FIG. 3 is a diagram illustrating an example grid with a first dimension and a second dimension, and samples identified thereon, in accordance with various aspects and implementations of the subject disclosure. Repetitive description of like elements employed in other embodiments described herein is omitted for sake of brevity. FIG. 3 includes an example definition 301 including sample points 302. The definition 301 is processed by sample grid builder 213 to place sample points 302 on a subsampled grid 300. Example sample point 311 can be, for example, one of sample points 302 as placed on subsampled grid 300. Subsampled grid 300 can have a first dimension 304 and a second dimension 306, and a granularity defined by a sampling interval 305.

In some embodiments, the first dimension 304, second dimension 306, and sampling interval 305 can be included in sample definition 301. In other embodiments, first dimension 304, second dimension 306, and/or sampling interval 305 can be, e.g., defined in advance of receiving definition 301 at mobile device 210.

Furthermore, in some embodiments, the first dimension 304 can be time and the second dimension 306 can be frequency. In some embodiments, the first dimension 304 can be delay and the second dimension 306 can be Doppler. Sample points 302, and resulting sample values at the sample points 302, can be transformed as needed at the mobile device 210 or at the base station 200, e.g., from the time-frequency domain to the delay-Doppler domain, and vice versa. Other domains may also be used in some embodiments.

The subsampled grid 300 and sample points 311 can be generated and used at a mobile device 210 such as illustrated in FIG. 2. The mobile device 210 can use the subsampled grid 300 and sample points 311 to determine which radio frequencies to sample, e.g., by a sampler 214. Measured sample values at the sample points 311 are referred to herein as sample data 114.

Figure 4:
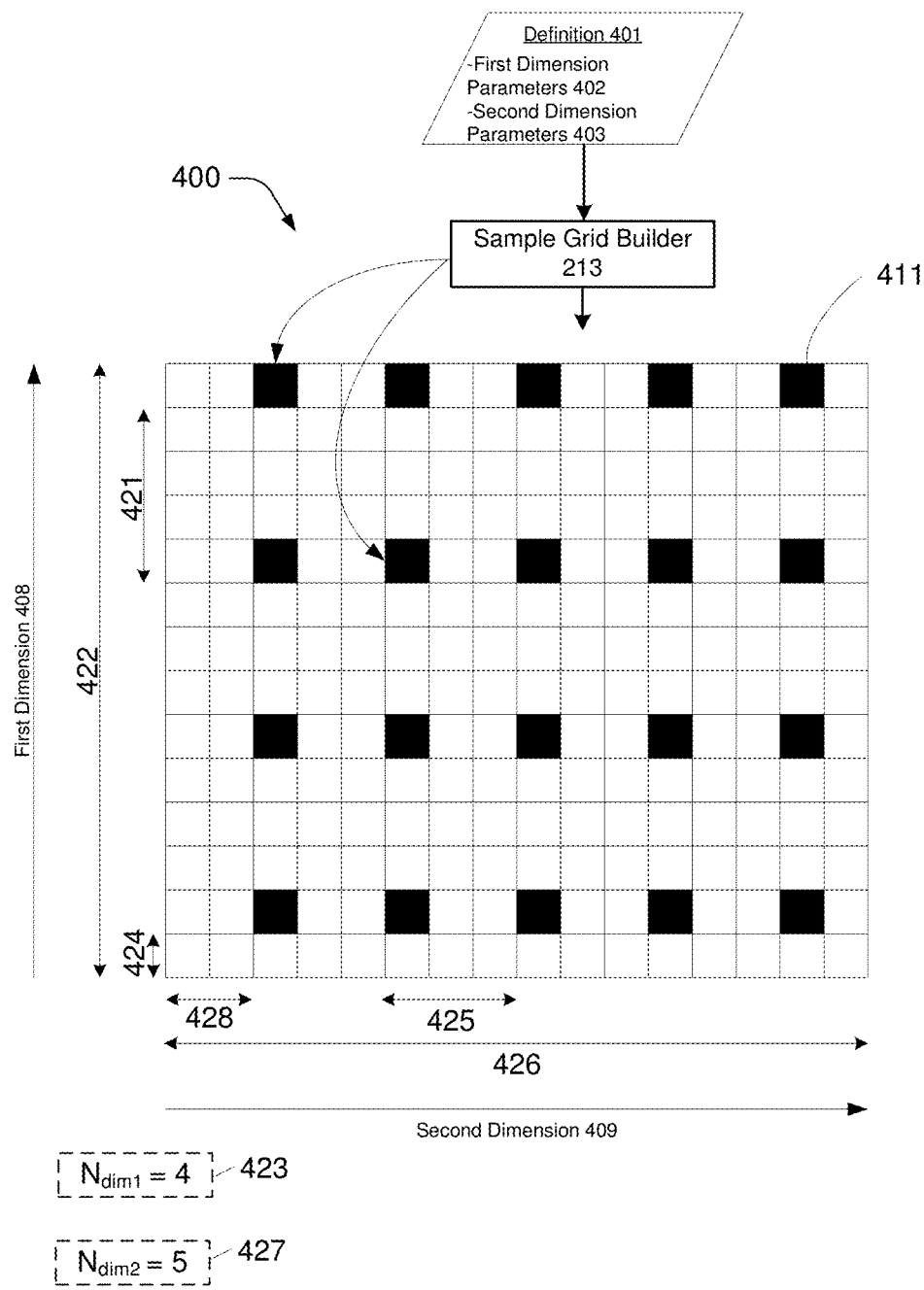
FIG. 4 is a diagram illustrating another example grid with a first dimension and a second dimension, and samples identified thereon, in accordance with various aspects and implementations of the subject disclosure.

FIG. 4 is a diagram illustrating another example grid with a first dimension and a second dimension, and samples identified thereon, in accordance with various aspects and implementations of the subject disclosure. Repetitive description of like elements employed in other embodiments described herein is omitted for sake of brevity. FIG. 4 includes an example definition 401 including first dimension parameters 402 and second dimension parameters 403. The definition 401 is processed by sample grid builder 213 to produce subsampled grid 400 which has first dimension 408 and second dimension 409. Sample grid builder 213 can furthermore place sample points, such as example sample point 411, as defined by first dimension parameters 402 and second dimension parameters 403, on the subsampled grid 400.

In an example embodiment, first dimension parameters 402 can include at least two of: a first dimension sample period parameter 421, a first dimension sample span parameter 422, and/or a first dimension sample number parameter ($N_{dim1}$) 423. First dimension parameters 402 can also include a first offset 424, applicable to the first dimension 408. Likewise, second dimension parameters 403 can comprise at least two of: a second dimension sample period parameter 425, a second dimension sample span parameter 426, or a second dimension sample number parameter ($N_{dim2}$) 427. Second dimension parameters 402 can also include a second offset 428, applicable to the second dimension 409.

In the example illustrated by FIG. 4, in the first dimension 408, the first dimension sample period parameter 421 is 4, the first dimension sample span parameter 422 is 14, and the first dimension sample number parameter 423 is $N_{dim1}=4$ samples. If two of the above parameters are given, the third parameter can be determined from the two given parameters. Thus, in some embodiments, first dimension parameters 402 can include two of the above parameters, and sample grid builder 213 can determine the third parameter in connection with building the subsampled grid 400 and placing the samples 411 thereon. As shown in FIG. 4, an example first offset 424 is 1.

Similarly, in the second dimension 409, the second dimension sample period parameter 425 is 3, the second dimension sample span parameter 426 is 16, and second dimension sample number parameter 427 is $N_{dim2}=5$ samples. Second dimension parameters 403 can optionally include any two of the above parameters, and sample grid builder 213 can determine the third parameter in connection with building the subsampled grid 400 and placing the samples 411 thereon. As shown in FIG. 4, an example second offset 428 is 2.

The subsampled grid 400 and sample points 411 can be generated and used at a mobile device 210 such as illustrated in FIG. 2. The mobile device 210 can use the subsampled grid 400 and sample points 411 to determine which radio frequencies to sample, e.g., by a sampler 214. As will be appreciated, defining samples in terms of parameters, such as first dimension parameters 402 and second dimension parameters 403, or in terms of other rules such as discussed in connection with FIG. 5, can reduce transmission overhead of definitions 112 when compared to, e.g., defining each sample point individually. Measured sample values at the sample points 411 are referred to herein as sample data 114.

Figure 5:
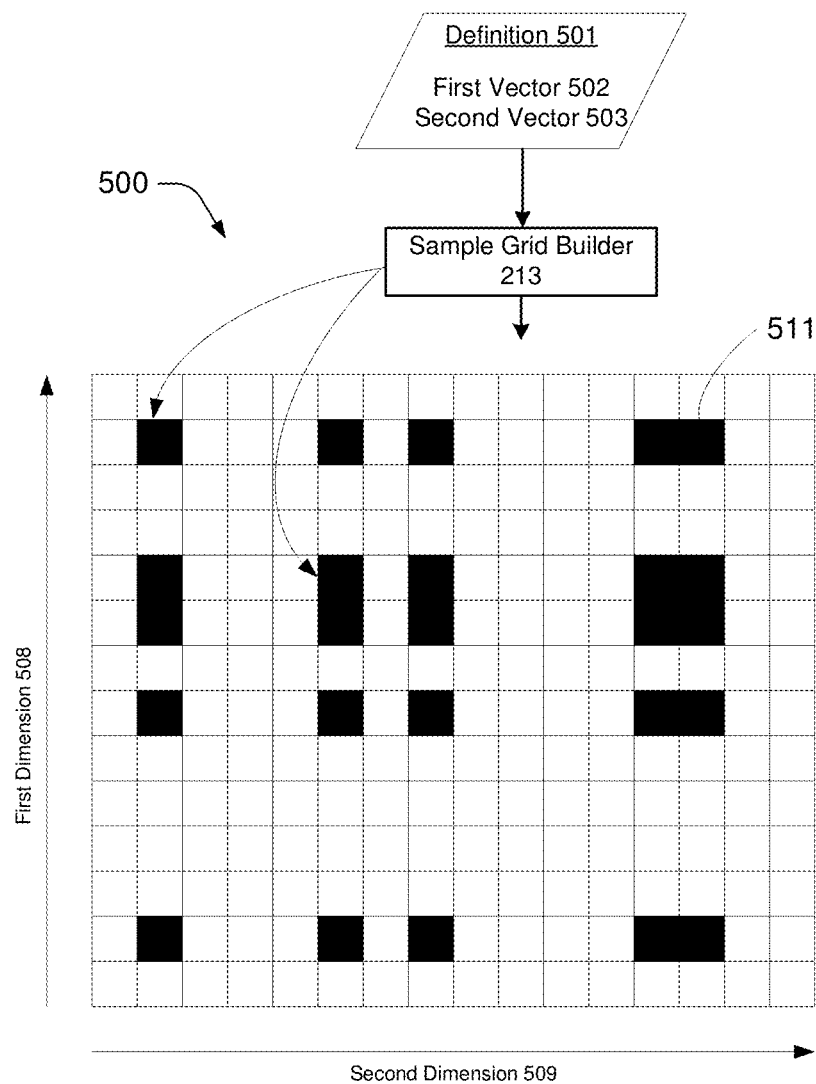
FIG. 5 is a diagram illustrating another example grid with a first dimension and a second dimension, and samples identified thereon, in accordance with various aspects and implementations of the subject disclosure.

FIG. 5 is a diagram illustrating another example grid with a first dimension and a second dimension, and samples identified thereon, in accordance with various aspects and implementations of the subject disclosure. Repetitive description of like elements employed in other embodiments described herein is omitted for sake of brevity. FIG. 5 includes an example definition 501 including a first vector 502 and a second vector 503. The definition 501 is processed by sample grid builder 213 to produce a subsampled grid 500 which has first dimension 508 and second dimension 509. Sample grid builder 213 can furthermore place sample points, such as example sample point 511, as defined by first vector 502 and second vector 503, on the subsampled grid 500.

In FIG. 5, the subsampled grid 500 is irregular but with a given structure. In particular, the sample points 511 on the sub sampled grid 500 are irregular in the first dimension 508 but this pattern repeats in the second dimension 509. Similarly, the sample points 511 on the sub sampled grid 500 are irregular in the second dimension 509 but this pattern repeats in the first dimension 508. In some embodiments, a single pair of vectors $x_{dim1}$ and $x_{dim2}$ can suffice to encode the entire irregular subsampled grid 500. Specifically, $x_{dim1}$ determines a first pattern in the first dimension 508, and $x_{dim2}$ determines how the first pattern is repeated in the second dimension 509.

In some embodiments, first vector 502 and second vector 503 can be represented by a respective combinatorial index $r_1$ and $r_2$. In order to represent first vector 502 and second vector 503 by a respective combinatorial index $r_1$ and $r_2$, for each dimension 508, 509, let $X_1$ and $X_2$ be the number of sample points 511 on the subsampled grid 500, e.g., $X_1=X_2=5$ in FIG. 5. Let $\{k_i^1\}_{i=0}^{X_1-1}$ and $\{k_i^2\}_{i=0}^{X_2-1}$ be the indices of the sample points 511 on the subsampled grid 500, with $k_i^j < k_{i+1}^j$ and $1 \leq k_i^j \leq X_j$. Then $$r_j = \sum_{i=0}^{X_j-1} \begin{Bmatrix} Y_j - k_i^j \\ X_j - i \end{Bmatrix}$$

where $Y_j$ is the span of the j-th dimension and $$\begin{Bmatrix} a \\ b \end{Bmatrix} = \begin{cases} \begin{pmatrix} a \\ b \end{pmatrix} & a \geq b \\ 0 & a < b \end{cases}$$

is the extended binomial coefficient. The combinatorial indices $r_1$ and $r_2$ uniquely represent first vector 502 ($x_{dim1}$) and second vector 503 ($x_{dim2}$).

The subsampled grid 500 and sample points 511 can be generated and used at a mobile device 210 such as illustrated in FIG. 2. The mobile device 210 can use the subsampled grid 500 and sample points 511 to determine which radio frequencies to sample, e.g., by a sampler 214. Measured sample values at the sample points 511 are referred to herein as sample data 114.

In some embodiments, two dimensional grids 300, 400, 500 such as illustrated in FIG. 3, FIG. 4, and FIG. 5 can be subsampled at a mobile device 210 such as illustrated in FIG. 2, for the purpose of overhead reduction and feedback compression. A definition 301, 401, 501 can define a set of sample points, parameters, vectors, or, e.g., combinatorial indices. The subsampling can be regular, e.g., as shown in FIG. 4, or irregular as shown in FIG. 5. In the case of regular subsampling, mobile device 210 can optionally report values for each sample point of a grid, including sample points with zero energy. Zero energy here means that the energy is below are predefined or configurable threshold. Alternatively, in case of irregular subsampling, embodiments may optionally report only non-zero values. The irregular structure can thus be a consequence of omitting the values below the threshold.

In some embodiments, overhead and complexity can be reduced by leveraging reciprocity in FDD systems. Because in FDD systems, the base station (e.g., base station 200) transmits in one part of the spectrum (downlink) whereas the mobile station (e.g., mobile device 210) transmits in a different part of the spectrum (uplink), the physical channel downlink and uplink are different. Nevertheless, the physical paths that constitute the environment between the base station 200 and the mobile station 210 are the same. Hence, the fast varying channel in the time-frequency domain can be mathematically mapped to a different two-dimensional domain, the delay-Doppler domain, which is slowly varying as compared to the time-frequency domain. The mobile station 210 can then estimate CSI in the delay-Doppler domain, and because the channel is somewhat stable in that domain, mobile station 210 can feedback the CSI back to the base station 200, where it can be mapped (transformed) back to the time-frequency domain, with less overhead and lower computational burden.

Because existing orthogonal frequency-division multiple access (OFDMA) systems, such as the 3GPP 5G NR system, have predefined subcarrier spacing and symbol durations, embodiments can optionally use time-frequency domains to ensure backward compatibility. The aforementioned mapping, or transform, from the time-frequency domain to the delay-Doppler domain, can map from a first two-dimensional grid with dimensions time and frequency to a second two-dimensional grid with dimensions delay and Doppler. Some embodiments can control overhead of CSI feedback in the delay-Doppler domain by subsampling the second two-dimensional grid according to the embodiments herein.

Returning to FIG. 2, mobile device 210 can use sample grid builder 213 to build grids such as illustrated in FIG. 3, FIG. 4 and FIG. 5, in order to determine sample points 311, 411, or 511. The sample points 311, 411, or 511 can then be used by sampler 214 to perform sampling, e.g., by measuring radio frequency signal strength at each of the sample points 311, 411, or 511. The resulting sample values can then optionally be compressed according to any of a variety of compression techniques, by sample data compressor 215.

A number of compression techniques are disclosed herein as examples. Those of skill in the art will appreciate that the compression techniques can be combined or other techniques can be used without departing from the scope and spirit of this disclosure. In some embodiments, sample data compressor 215 can remove sample values that are below a defined threshold, while retaining and reporting to base station 200 sample values above the defined threshold. For example, let M equal the total number of sample points. In FIG. 4, M=20 and in FIG. 5, M=25. A number of sample values K can be retained, where K<M, and wherein the retained sample values are above a defined threshold.

In another example compression technique, sample data compressor 215 can retain the Q "best" values, that is, values that are closer to a specified quality criteria in comparison to other values, and sample data compressor 215 can remove the other values. In yet another example compression technique, sample data compressor 215 can apply a fixed overhead, such as A bits. In this example, the sample data compressor 215 can retain as many values as it can encode without exceeding A. In some embodiments, a single value for Q (or a single value for A) can apply to both the first and second grid dimensions. Alternatively, different values of Q (or different values of A) can be configured per grid dimension.

After compression at sample data compressor 215, the retained samples can optionally be transformed at sample transformer 216, e.g., from the time-frequency domain to the delay-Doppler domain or vice versa. The resulting sample data 114 can then be transmitted by sample data transmitter 217 to the base station 200. At the base station 200, the sample data 114 can be received by sample receiver 203, and optionally transformed, e.g., from the time-frequency domain to the delay-Doppler domain or vice versa, by sample transformer 204. The base station 200 may then use the received sample data for any desired purpose, e.g., to adjust base station transmitter or receiver settings by signal adjuster 205. When the base station 200 controls a beamforming antenna, the signal adjuster may for example adjust a beam pattern by adjusting phase delay of multiple antenna elements in an antenna array.

In some embodiments, sample definitions such as 301, 401, and 501, which may be included in definitions 112, can be configured by the base station 200, e.g., at definition generator 201. The base station 200 can optionally use prior received sample data 114, e.g., sent to the base station 200 on a physical uplink shared channel (PUSCH) or a physical uplink control channel (PUCCH), to determine feasible definitions 112 for a mobile device 210. In some embodiments, the base station 200 can continuously adapt definitions 112 based on sample data 114 from the mobile device 210.

In other embodiments, the mobile device 210 can determine sample definitions autonomously, in which case definitions 112 need not be generated at base station 200. When the mobile device 210 reports autonomously sample data 114 based on autonomously selected sample definitions to the base station 200, the base station 200 can either accept or disregard some or all of the sample data 114 and corresponding sample definitions.

Figure 6:
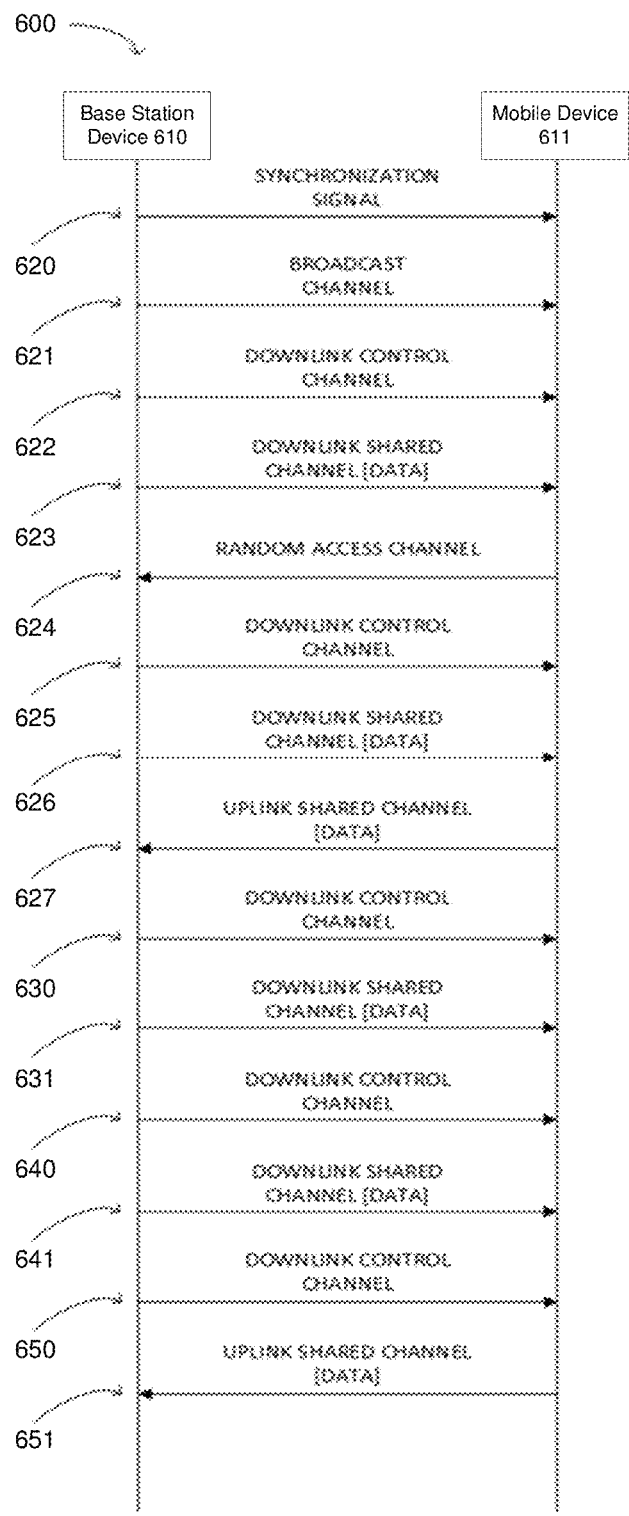
FIG. 6 illustrates example communications between a base station and a mobile device, in accordance with various aspects and implementations of the subject disclosure.

FIG. 6 illustrates example communications between a base station device and a mobile device, in accordance with various aspects and implementations of the subject disclosure. FIG. 6 includes a base station device 610 which may comprise, e.g., a device of base station 200 introduced in FIG. 2. FIG. 6 further includes a mobile device 611 which may comprise, e.g., a mobile device 210 introduced in FIG. 2. An example communication flow 600 between the base station device 610 and the mobile device 611 is illustrated.

As illustrated in FIG. 6, mobile device 611 can initially perform a cell search procedure by decoding a synchronization signal 620 from the base station device 610. After successfully decoding the synchronization signal 620, the mobile device 611 can proceed to acquire the master system information carried on the physical broadcast channel (PBCH) 621. The master system information configures the mobile device 611 for reception of remaining system information (RMSI) transmitted by a physical downlink shared channel (PDSCH) 623 which is scheduled by a physical downlink control channel transmission (PDCCH) 622. The RMSI then configures the mobile device 611 for a random access procedure whereby mobile device 611 can send a physical random access channel (PRACH) 624 to base station device 610 (message 1). Base station device 610 can respond via a random access response (RAR) carried by a physical downlink shared channel (PDSCH) 626 scheduled by a physical downlink control channel transmission (PDCCH) 625 (message 2). Finally, the mobile device 611 can send message 3 on a physical uplink shared channel (PUSCH) 627 scheduled by message 2 in 626.

If necessary, contention resolution can be performed by the network by transmitting message 4 from base station device 610 to the intended mobile device 611 informing other contending mobile devices of the contention. Message 4 can be scheduled by PDCCH 630 and transmitted by PDSCH 631. After successful contention resolution, mobile device 611 can be provided a dedicated radio resource control (RRC) configuration in PDSCH transmission 641 which is scheduled by PDCCH 640. At this point, base station device 610 and mobile device 611 have successfully established a dedicated communication link. Subsequently, or else as part of the initial RRC configuration in 641, mobile device 611 can be configured according to the embodiments herein. The base station device 610 can send DCI on a physical downlink control channel transmission in 450, followed by reporting CSI according to the embodiments herein in uplink transmission 451.

In some embodiments, the mobile device 611 can be configured at least in part using the RRC protocol. The RRC configuration determines the mobile device 611 behavior in regard to some bits in the downlink control information (DCI) sent on a physical downlink control channel (PDCCH). For example, the RRC configuration may configure multiple parameter sets for various aspects and embodiments of the subject disclosure, such as but not limited to the definitions 301, 401, and 501. By sending DCI on the PDCCH, the base station device 610 can select a definition such as 301, 401, or 501 to be used by the mobile station device 611.

After the RRC protocol, the base station device 610 can optionally change parameters, such as definitions 301, 401, and 501, using the multiple access control (MAC) protocol. For example, by sending MAC control elements (CEs) to the mobile device 611 on the physical downlink shared channel (PDSCH), the base station device 610 can cause the mobile device 611 to dynamically adapt some or all parameters of the RRC configuration.

In an aspect, reporting sample data 114 by the mobile device 611 to the base station device 610 according to various aspects and embodiments of the subject disclosure can be by sending uplink control information (UCI) on either a physical uplink shared channel (PUSCH) or a physical uplink control channel (PUCCH) transmission. In another aspect, reporting by the mobile station 611 to the base station device 610 can comprise sending MAC CEs on a physical uplink shared channel (PUSCH).

When the mobile device 611 reports to the base station device 610 according to various aspects and embodiments of the subject disclosure, mobile device 611 can include a header with the reported parameters. For example, when the mobile device 611 reports sample data 114 gathered according to the embodiments herein, e.g., using one or more vectors $x_{dim1}$ and $x_{dim2}$ or one or more combinatorial indices $r_1$ and $r_2$, a header can inform the base station device 610 about, e.g., corresponding vector or index information. A header can also optionally inform the base station device 610 about, e.g., parameters such as period, span, and the number of samples per dimension $N_{dim1}$ and $N_{dim2}$.

Figure 7:
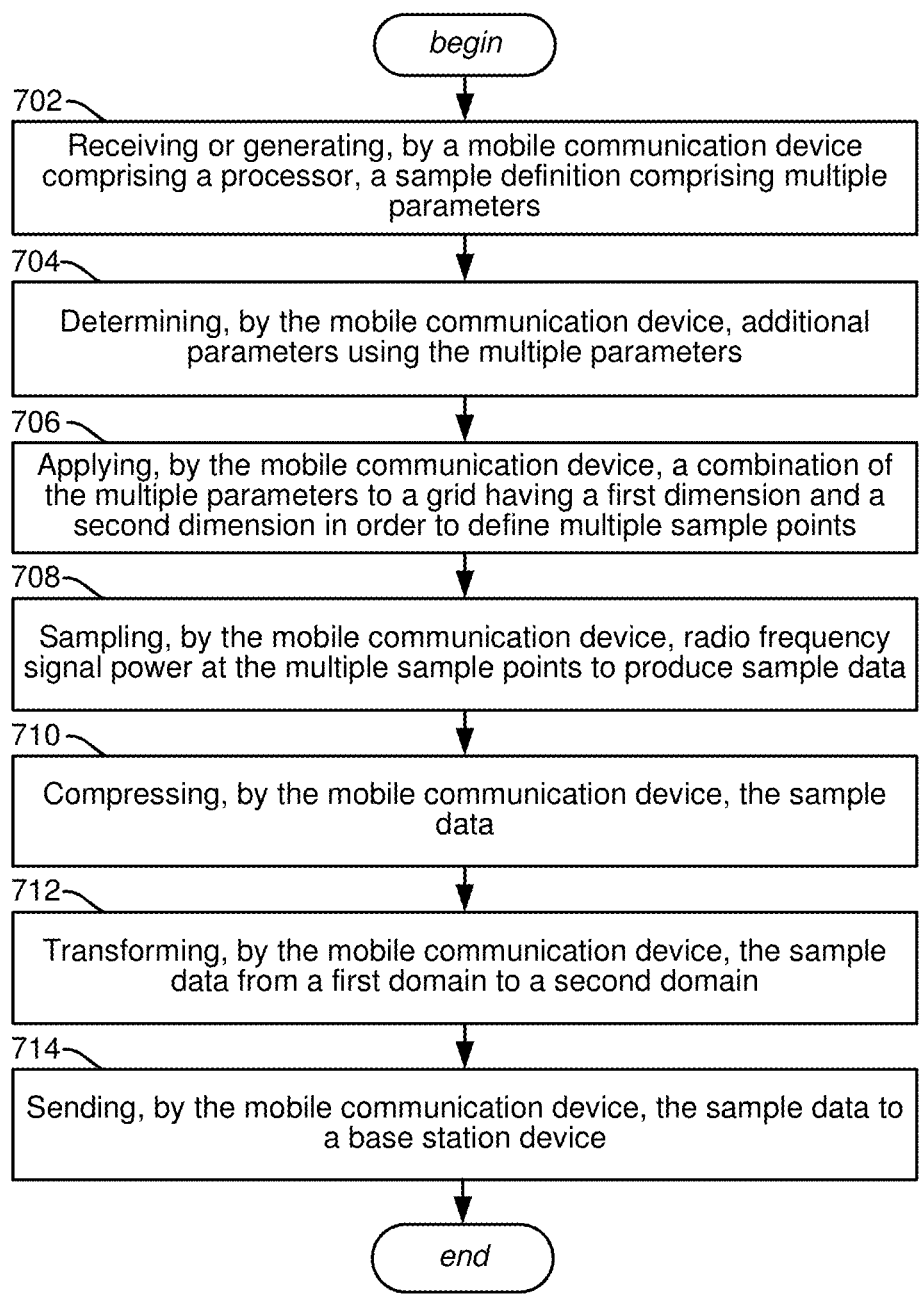
FIG. 7 is a flow diagram representing example operations of mobile device, in accordance with various aspects and implementations of the subject disclosure.

One or more aspects, such as implemented in a machine-readable storage medium, comprising executable instructions that, when executed by a processor, facilitate performance of operations, are represented in FIG. 7. FIG. 7 is a flow diagram representing example operations of a mobile device, in accordance with various aspects and implementations of the subject disclosure. Repetitive description of like elements employed in other embodiments described herein is omitted for sake of brevity. While the operations illustrated in FIG. 7 are illustrated in sequence, those of skill will appreciate that certain operations may be combined, re-ordered, or eliminated in some embodiments.

Example operations comprise operation 702, which represents receiving or generating, by a mobile communication device comprising a processor, a sample definition comprising multiple parameters. For example, with reference to FIG. 2, mobile device 210 can receive sample definitions 112 from base station 200, or mobile device 210 can generate a definition locally. The sample definition can comprise, e.g., at least two first dimension parameters for a first dimension of a grid, such as first dimension parameters 402 illustrated in FIG. 4, and at least two second dimension parameters for a second dimension of the grid, such as second dimension parameters 404 illustrated in FIG. 4. The sample definition can further comprise a first offset, such as 424 in FIG. 4, and a second offset such as 428 in FIG. 4.

Operation 704 represents determining, by the mobile communication device, additional parameters using the multiple parameters. For example, mobile device 210 can use any two parameters in a given grid dimension to determine a third parameter in the given grid dimension. A first or second dimension sample period parameter and a first or second dimension sample span parameter can be used to determine a first or second dimension sample number parameter. A first or second dimension sample period parameter and a first or second dimension sample number parameter can be used to determine a first or second dimension sample span parameter. A first or second dimension sample span parameter and a first or second dimension sample number parameter can be used to determine a first or second dimension sample period parameter.

Operation 706 represents applying, by the mobile communication device, a combination of the multiple parameters to a grid having a first dimension and a second dimension in order to define multiple sample points. For example, with reference to FIG. 4, the sample grid builder 213 at mobile device 210 can apply the first dimension parameters 402 and the second dimension parameters 404 in grid 400 having first dimension 408 and second dimension 409, in order to define multiple sample points such as sample point 411.

Operation 708 represents sampling, by the mobile communication device, radio frequency signal power at the multiple sample points to produce sample data. For example, with reference to FIG. 2, mobile device 210 can sample radio frequency signal power of radio frequencies transmitted by base station 200, at each of the sample points illustrated in FIG. 4.

Operation 710 represents compressing, by the mobile communication device, the sample data. For example, mobile device 210 can compress sample data resulting from operation 706 according to any desired compression technique. In some embodiments, sample data corresponding to certain of the sample points can be removed from the sample data, as described in connection with the compression techniques disclosed herein.

Operation 712 represents transforming, by the mobile communication device, the sample data from a first domain to a second domain. For example, sample transformer 216 can transform sample data in a delay-Doppler domain into a time-frequency domain, or vice versa.

Operation 714 represents sending, by the mobile communication device, the sample data from a first domain to a second domain. For example, sample data transmitter 217 can transmit sample data 114, produced by the sampling at operation 706 and optionally compressed and transformed at operations 710 and 712, to a base station device 200. The sample data 114 comprises, e.g., radio frequency signal power at at least two of the multiple sample points illustrated in FIG. 4.

Figure 8:
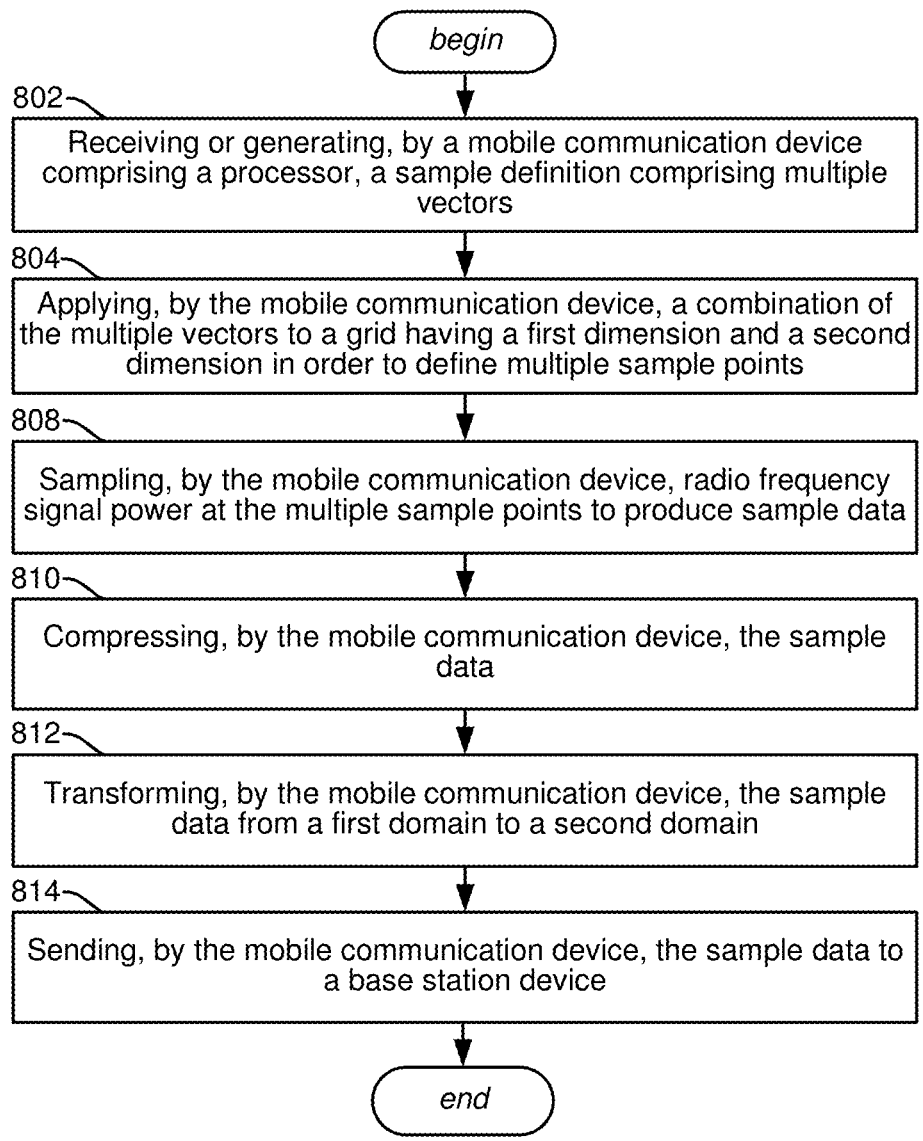
FIG. 8 is a flow diagram representing example operations of mobile device, in accordance with various aspects and implementations of the subject disclosure.

One or more aspects, such as implemented in a machine-readable storage medium, comprising executable instructions that, when executed by a processor, facilitate performance of operations, are represented in FIG. 8. FIG. 8 is a flow diagram representing example operations of a mobile device, in accordance with various aspects and implementations of the subject disclosure. Repetitive description of like elements employed in other embodiments described herein is omitted for sake of brevity. While the operations illustrated in FIG. 8 are illustrated in sequence, those of skill will appreciate that certain operations may be combined, re-ordered, or eliminated in some embodiments.

Example operations comprise operation 802, which represents receiving or generating, by a mobile communication device comprising a processor, a sample definition comprising multiple vectors. For example, with reference to FIG. 2, mobile device 210 can receive sample definitions 112 from base station 200, or mobile device 210 can generate a definition locally. The sample definition can comprise, e.g., a first vector that defines an irregular sample pattern for a first dimension of a grid, such as first vector 502 illustrated in FIG. 5, and a second vector that defines, for a second dimension of the grid, a repetition of the irregular sample pattern defined by the first vector, such as vector 503 illustrated in FIG. 5. The sample definition can further comprise other information such as grid properties, offsets, and domain for the grid 500.

Operation 804 represents applying, by the mobile communication device, a combination of the multiple vectors to a grid having a first dimension and a second dimension in order to define multiple sample points. For example, with reference to FIG. 5, the sample grid builder 213 at mobile device 210 can apply the first vector 502 and the second vector 504 in the grid 500 having first dimension 508 and second dimension 509, in order to define multiple sample points such as sample point 511.

Operations 808, 810, 812, and 814 can be generally identical to operations 708, 710, 712, and 714, illustrated in FIG. 7. While the sample points are initially defined differently, once the sample points are established and sampling is underway, the methods can be the same. Namely, operation 808 represents sampling, by the mobile communication device, radio frequency signal power at the multiple sample points to produce sample data. Operation 810 represents compressing, by the mobile communication device, the sample data. Operation 812 represents transforming, by the mobile communication device, the sample data from a first domain to a second domain. Operation 814 represents sending, by the mobile communication device, the sample data from a first domain to a second domain.

Figure 9:
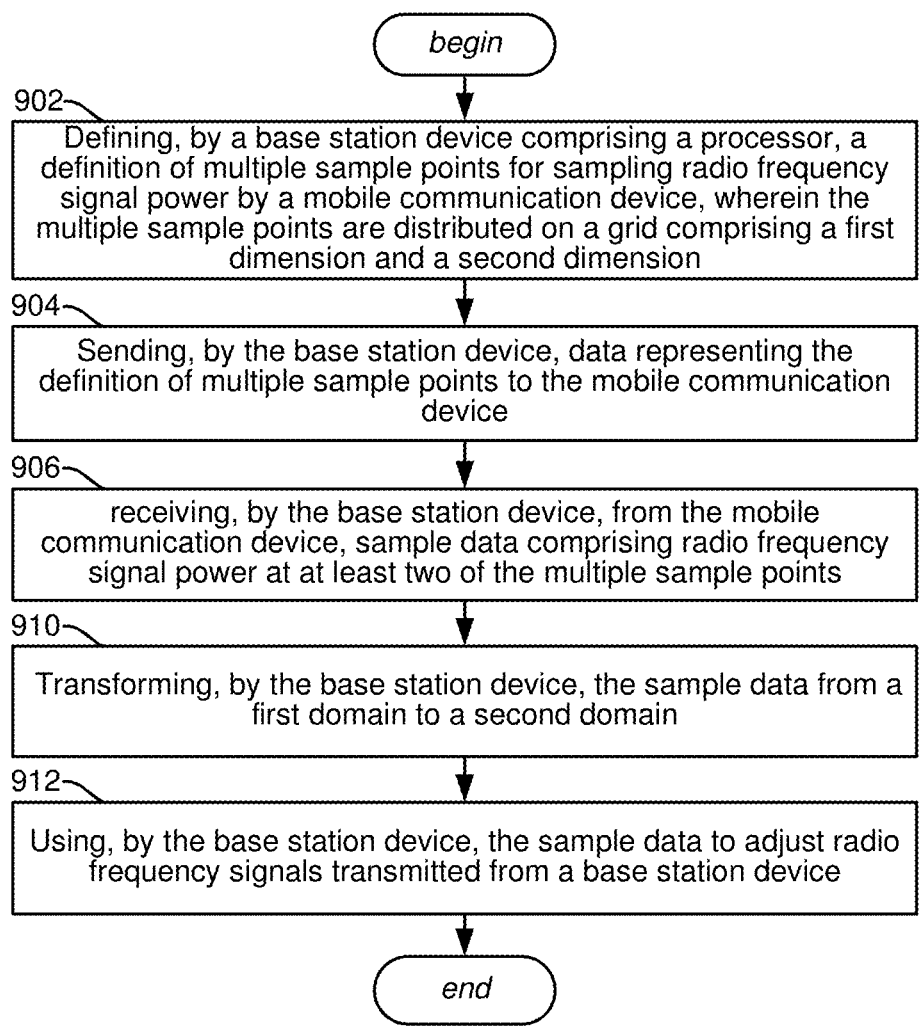
FIG. 9 is a flow diagram representing example operations of base station device, in accordance with various aspects and implementations of the subject disclosure.

One or more aspects, such as implemented in a machine-readable storage medium, comprising executable instructions that, when executed by a processor, facilitate performance of operations, are represented in FIG. 9. FIG. 9 is a flow diagram representing example operations of a base station device, in accordance with various aspects and implementations of the subject disclosure. Repetitive description of like elements employed in other embodiments described herein is omitted for sake of brevity. While the operations illustrated in FIG. 9 are illustrated in sequence, those of skill will appreciate that certain operations may be combined, re-ordered, or eliminated in some embodiments.

Example operations comprise operation 902, which represents defining a definition of multiple sample points for sampling radio frequency signal power by a mobile communication device, wherein the multiple sample points are distributed on a grid comprising a first dimension and a second dimension. For example, with reference to FIG. 2, definition generator 201 at base station 200 can generate a definition of multiple sample points such as definitions 112. Definitions 112 may be represented in a variety of ways, such as the parameters described in connection with FIG. 4, or the vectors described in connection with FIG. 5. In general, multiple sample points defined by a particular definition need not be actually imaged on a grid—they may be defined for use in the context of a grid as will be appreciated. It will be appreciated that the images of grids provided herein are for human understanding and the grids can be used mathematically and computationally without necessarily generating a corresponding visual grid.

Operation 904 represents sending, by the base station device, data representing the definition of multiple sample points to the mobile communication device. For example, with reference to FIG. 2, definition transmitter 202 can send definitions 112 to mobile device. In embodiments wherein mobile device 210 autonomously generates definitions, operations 902 and 904 may be eliminated.

Operation 906 represents receiving, by the base station device, from the mobile communication device, sample data comprising radio frequency signal power at at least two or more of the multiple sample points. For example, with reference to FIG. 2, after sampling at mobile device 210, sample receiver 203 at base station 200 can receive sample data 114 from mobile device 210.

Operation 910 represents transforming, by the base station device, the sample data from a first domain to a second domain. For example, with reference to FIG. 2, base station 200 can transform sample data 114 from a time-frequency domain to a delay-Doppler domain, or vice versa.

Operation 912 represents using, by the base station device, the sample data to adjust radio frequency signals transmitted from a base station device. For example, with reference to FIG. 2, signal adjuster 205 can adjust radio frequency signals transmitted from base station device 200. Signal adjuster 205 can, for example, increase or decrease radio frequency signal power, or adjust phase of antenna elements in an antenna array to alter a beam pattern.

Figure 10:
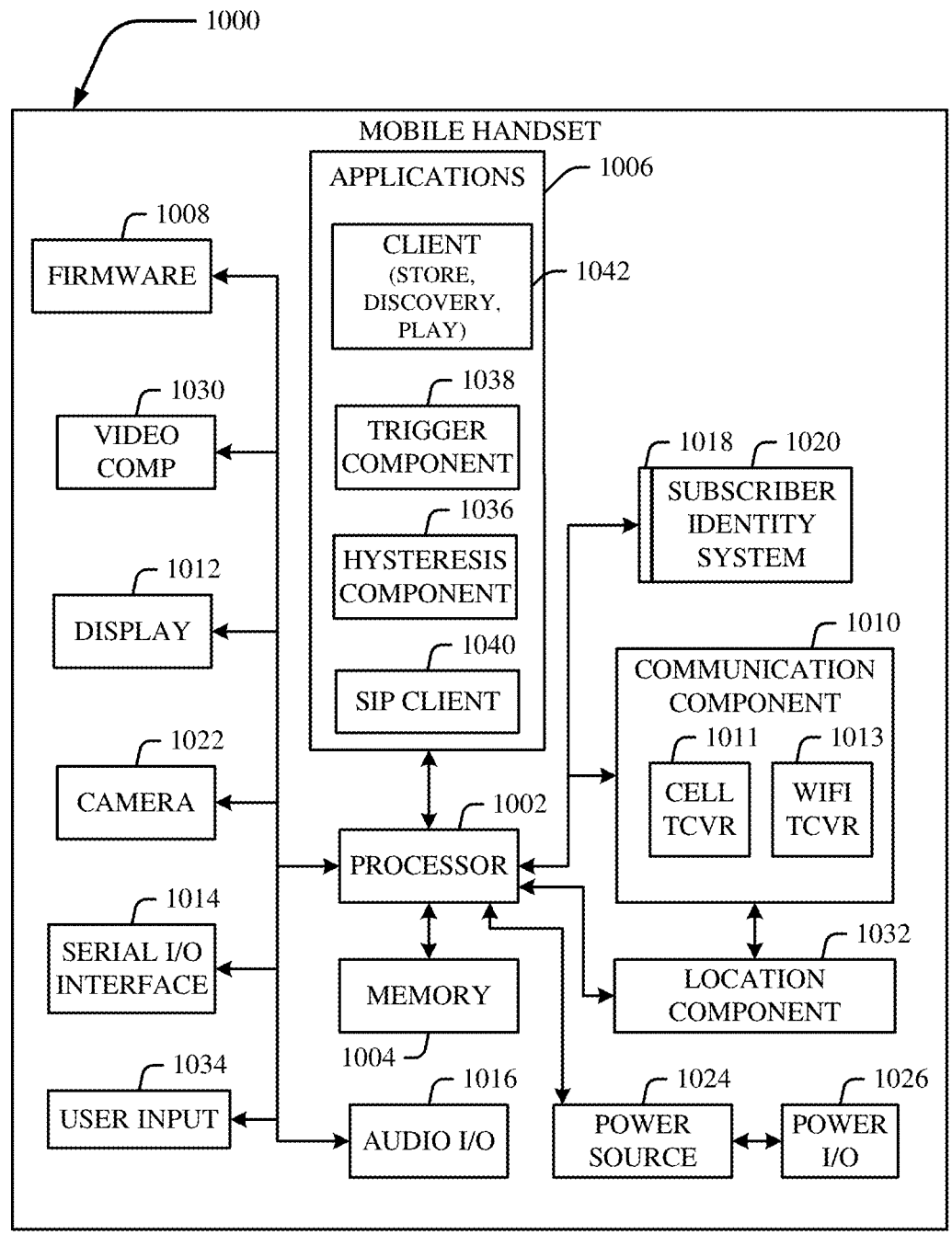
FIG. 10 is a block diagram of an example mobile handset operable to engage in a system architecture that facilitates wireless communications according to one or more embodiments described herein.

Referring now to FIG. 10, illustrated is an example block diagram of an example mobile handset 1000 operable to engage in a system architecture that facilitates wireless communications according to one or more embodiments described herein. Mobile handset 1000 is one example mobile device 210 such as illustrated in FIG. 2. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset includes a processor 1002 for controlling and processing all onboard operations and functions. A memory 1004 interfaces to the processor 1002 for storage of data and one or more applications 1006 (e.g., a video player software, user feedback component software, etc.). Other applications can include voice recognition of predetermined voice commands that facilitate initiation of the user feedback signals. The applications 1006 can be stored in the memory 1004 and/or in a firmware 1008, and executed by the processor 1002 from either or both the memory 1004 or/and the firmware 1008. The firmware 1008 can also store startup code for execution in initializing the handset 1000. A communications component 1010 interfaces to the processor 1002 to facilitate wired/wireless communication with external systems, e.g., cellular networks, VoIP networks, and so on. Here, the communications component 1010 can also include a suitable cellular transceiver 1011 (e.g., a GSM transceiver) and/or an unlicensed transceiver 1013 (e.g., Wi-Fi, WiMax) for corresponding signal communications. The handset 1000 can be a device such as a cellular telephone, a PDA with mobile communications capabilities, and messaging-centric devices. The communications component 1010 also facilitates communications reception from terrestrial radio networks (e.g., broadcast), digital satellite radio networks, and Internet-based radio services networks.

The handset 1000 includes a display 1012 for displaying text, images, video, telephony functions (e.g., a Caller ID function), setup functions, and for user input. For example, the display 1012 can also be referred to as a "screen" that can accommodate the presentation of multimedia content (e.g., music metadata, messages, wallpaper, graphics, etc.). The display 1012 can also display videos and can facilitate the generation, editing and sharing of video quotes. A serial I/O interface 1014 is provided in communication with the processor 1002 to facilitate wired and/or wireless serial communications (e.g., USB, and/or IEEE 1394) through a hardwire connection, and other serial input devices (e.g., a keyboard, keypad, and mouse). This can support updating and troubleshooting the handset 1000, for example. Audio capabilities are provided with an audio I/O component 1016, which can include a speaker for the output of audio signals related to, for example, indication that the user pressed the proper key or key combination to initiate the user feedback signal. The audio I/O component 1016 also facilitates the input of audio signals through a microphone to record data and/or telephony voice data, and for inputting voice signals for telephone conversations.

The handset 1000 can include a slot interface 1018 for accommodating a SIC (Subscriber Identity Component) in the form factor of a card Subscriber Identity Module (SIM) or universal SIM 1020, and interfacing the SIM card 1020 with the processor 1002. However, it is to be appreciated that the SIM card 1020 can be manufactured into the handset 1000, and updated by downloading data and software.

The handset 1000 can process IP data traffic through the communications component 1010 to accommodate IP traffic from an IP network such as, for example, the Internet, a corporate intranet, a home network, a person area network, etc., through an ISP or broadband cable provider. Thus, VoIP traffic can be utilized by the handset 1000 and IP-based multimedia content can be received in either an encoded or decoded format.

A video processing component 1022 (e.g., a camera) can be provided for decoding encoded multimedia content. The video processing component 1022 can aid in facilitating the generation, editing, and sharing of video quotes. The handset 1000 also includes a power source 1024 in the form of batteries and/or an AC power subsystem, which power source 1024 can interface to an external power system or charging equipment (not shown) by a power 110 component 1026.

The handset 1000 can also include a video component 1030 for processing video content received and, for recording and transmitting video content. For example, the video component 1030 can facilitate the generation, editing and sharing of video quotes. A location tracking component 1032 facilitates geographically locating the handset 1000. As described hereinabove, this can occur when the user initiates the feedback signal automatically or manually. A user input component 1034 facilitates the user initiating the quality feedback signal. The user input component 1034 can also facilitate the generation, editing and sharing of video quotes. The user input component 1034 can include such conventional input device technologies such as a keypad, keyboard, mouse, stylus pen, and/or touchscreen, for example.

Referring again to the applications 1006, a hysteresis component 1036 facilitates the analysis and processing of hysteresis data, which is utilized to determine when to associate with the access point. A software trigger component 1038 can be provided that facilitates triggering of the hysteresis component 1036 when the Wi-Fi transceiver 1013 detects the beacon of the access point. A SIP client 1040 enables the handset 1000 to support SIP protocols and register the subscriber with the SIP registrar server. The applications 1006 can also include a client 1042 that provides at least the capability of discovery, play and store of multimedia content, for example, music.

The handset 1000, as indicated above related to the communications component 1010, includes an indoor network radio transceiver 1013 (e.g., Wi-Fi transceiver). This function supports the indoor radio link, such as IEEE 802.11, for the dual-mode GSM handset 1000. The handset 1000 can accommodate at least satellite radio services through a handset that can combine wireless voice and digital radio chipsets into a single handheld device.

Figure 11:
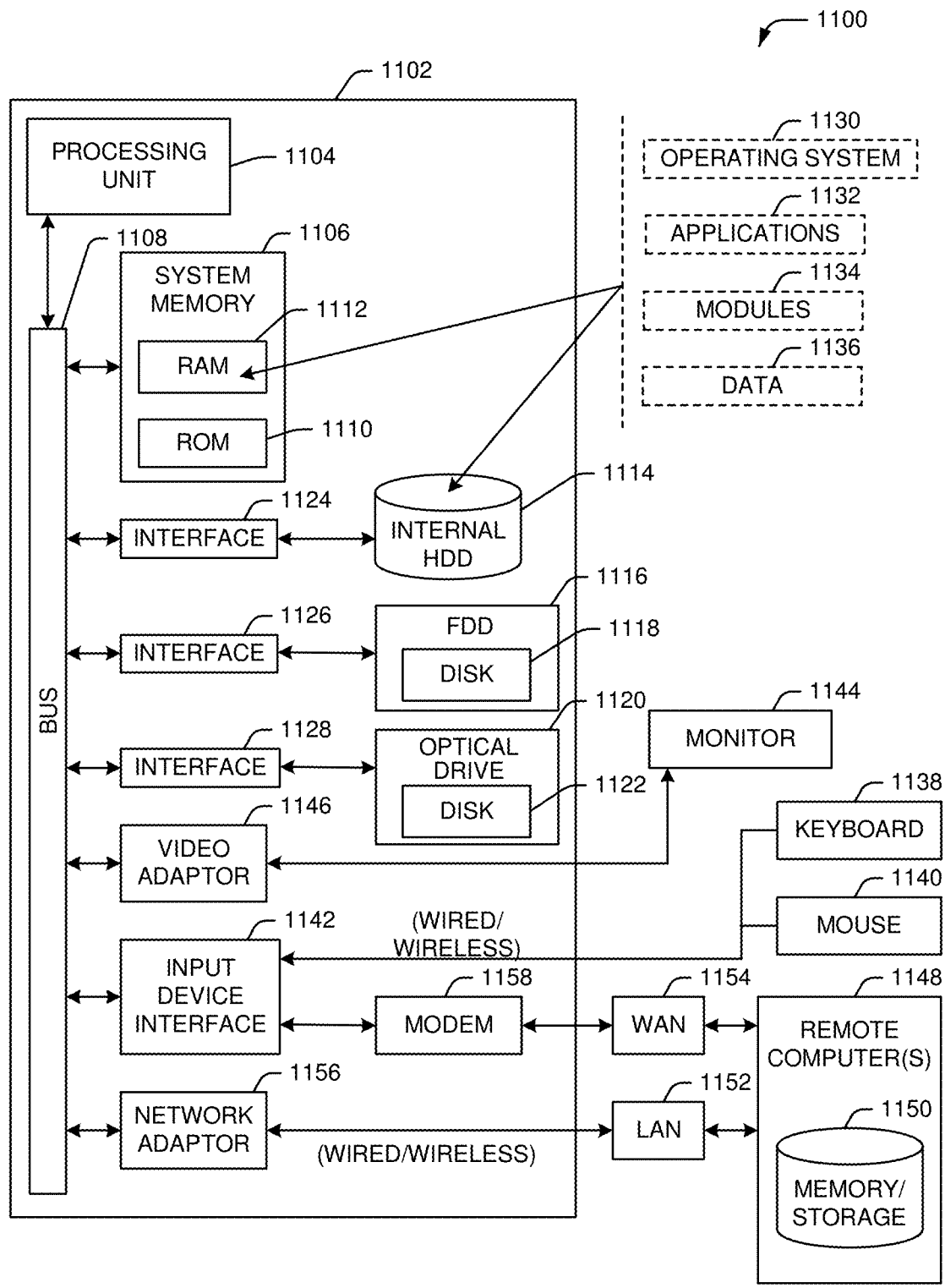
FIG. 11 illustrates a suitable computing environment in which the various aspects of this disclosure can be implemented, in accordance with various aspects and implementations of the subject disclosure.

In order to provide additional context for various embodiments described herein, FIG. 11 and the following discussion are intended to provide a general description of a suitable computing environment 1100 in which the various embodiments of the embodiment described herein can be implemented. The computer 1102 can implement, for example, a base station device 200 such as illustrated in FIG. 2.

While the embodiments have been described above in the general context of computer-executable instructions that can run on one or more computers, those skilled in the art will recognize that the embodiments can be also implemented in combination with other program modules and/or as a combination of hardware and software. Generally, program modules include routines, programs, components, data structures, etc., that perform particular tasks or implement particular abstract data types. Moreover, those skilled in the art will appreciate that the disclosed methods can be practiced with other computer system configurations, including single-processor or multiprocessor computer systems, mini-computers, mainframe computers, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). While the internal HDD 1114 is illustrated as located within the computer 1102, the internal HDD 1114 can also be configured for external use in a suitable chassis (not shown). The HDD 1114, magnetic FDD 1116 and optical disk drive 1120 can be connected to the system bus 1108 by an HDD interface 1124, a magnetic disk drive interface 1126 and an optical drive interface 1128, respectively. The interface 1124 for external drive implementations includes at least one or both of Universal Serial Bus (USB) and Institute of Electrical and Electronics Engineers (IEEE) 1194 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to an HDD, a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

A user can enter commands and information into the computer 1102 through one or more wired/wireless input devices, e.g., a keyboard 1138 and a pointing device, such as a mouse 1140. Other input devices (not shown) can include a microphone, an infrared (IR) remote control, a joystick, a game pad, a stylus pen, touch screen or the like. These and other input devices are often connected to the processing unit 1104 through an input device interface 1142 that can be coupled to the system bus 1108, but can be connected by other interfaces, such as a parallel port, an IEEE 1194 serial port, a game port, a USB port, an IR interface, etc.

A monitor 1144 or other type of display device can be also connected to the system bus 1108 via an interface, such as a video adapter 1146. In addition to the monitor 1144, a computer typically includes other peripheral output devices (not shown), such as speakers, printers, etc.

The computer 1102 can operate in a networked environment using logical connections via wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1152 through a wired and/or wireless communication network interface or adapter 1156. The adapter 1156 can facilitate wired or wireless communication to the LAN 1152, which can also include a wireless access point (AP) disposed thereon for communicating with the wireless adapter 1156.

When used in a WAN networking environment, the computer 1102 can include a modem 1158 or can be connected to a communications server on the WAN 1154 or has other means for establishing communications over the WAN 1154, such as by way of the Internet. The modem 1158, which can be internal or external and a wired or wireless device, can be connected to the system bus 1108 via the input device interface 1142. In a networked environment, program modules depicted relative to the computer 1102 or portions thereof, can be stored in the remote memory/storage device 1150. It will be appreciated that the network connections shown are example and other means of establishing a communications link between the computers can be used.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 10BaseT wired Ethernet networks used in many offices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   receiving, by a device comprising a processor, a sample definition;
   using, by the device, the sample definition to identify sample points,
   wherein the sample points are identified using first dimension parameters and second dimension parameters applicable to a sample grid comprising a first dimension and a second dimension; and
   sampling, by the device, radio frequency signal power at the sample points,
   wherein the sampling produces sample data comprising radio frequency signal power measurements at the sample points.

2. The method of claim 1, wherein the device is a mobile device, and further comprising sending, by the mobile device, the sample data to a base station.

3. The method of claim 1, further comprising compressing, by the device, the sample data.

4. The method of claim 1, further comprising transforming, by the device, the sample data.

5. The method of claim 1, wherein the first dimension is time the second dimension is frequency.

6. The method of claim 1, wherein the first dimension is delay and the second dimension is Doppler.

7. The method of claim 1, wherein the first dimension parameters comprise a sample period parameter.

8. The method of claim 1, wherein the first dimension parameters comprise a sample span parameter.

9. The method of claim 1, wherein the first dimension parameters comprise a sample number parameter.

10. The method of claim 1, wherein the first dimension parameters comprise a first offset applicable to the first dimension.

11. A mobile device, comprising:
    a processor; and
    a memory that stores executable instructions that, when executed by the processor, facilitate performance of operations, comprising:
    receiving a sample definition from a base station;
    in response to receiving the sample definition:
      using the sample definition to identify sample points, wherein the sample points are identified using first dimension parameters and second dimension parameters applicable to a sample grid comprising a first dimension and a second dimension;
      sampling radio frequency signal power at the sample points, wherein the sampling produces sample data comprising radio frequency signal power measurements at the sample points; and
      sending the sample data to the base station.

12. The mobile device of claim 11, wherein the operations further comprise compressing the sample data, resulting in compressed sample data, and wherein the sample data sent to the base station is the compressed sample data.

13. The mobile device of claim 11, wherein the operations further comprise transforming the sample data, resulting in transformed sample data, and wherein the sample data sent to the base station is the transformed sample data.

14. The mobile device of claim 11, wherein the first dimension is time and the second dimension is frequency.

15. The mobile device of claim 11, wherein the first dimension is delay and the second dimension is Doppler.

16. A non-transitory machine-readable medium, comprising executable instructions that, when executed by a processor, facilitate performance of operations, comprising:
    receiving a sample definition comprising a first vector and a second vector;
    using the sample definition to identify sample points, wherein the sample points are identified using the first vector and the second vector, wherein the first vector defines an irregular sample pattern for a first dimension of a sample grid, and the second vector defines, for a second dimension of the sample grid, a repetition of the irregular sample pattern defined by the first vector; and
    sampling, by the device, radio frequency signal power at the sample points,
    wherein the sampling produces sample data comprising radio frequency signal power measurements at the sample points.

17. The non-transitory machine-readable medium of claim 16, wherein the operations further comprise sending the sample data to a base station.

18. The non-transitory machine-readable medium of claim 17, wherein the operations further comprise limiting the sample data that is sent to the base station to a defined total number of sample values.

19. The non-transitory machine-readable medium of claim 17, wherein the operations further comprise limiting the sample data that is sent to the base station to sample values that are at least a defined threshold value.

20. The non-transitory machine-readable medium of claim 16, wherein the second vector defines, for the second dimension of the grid, a regular repetition pattern of the irregular sample pattern defined by the first vector.

\* \* \* \* \*